Figure 1:
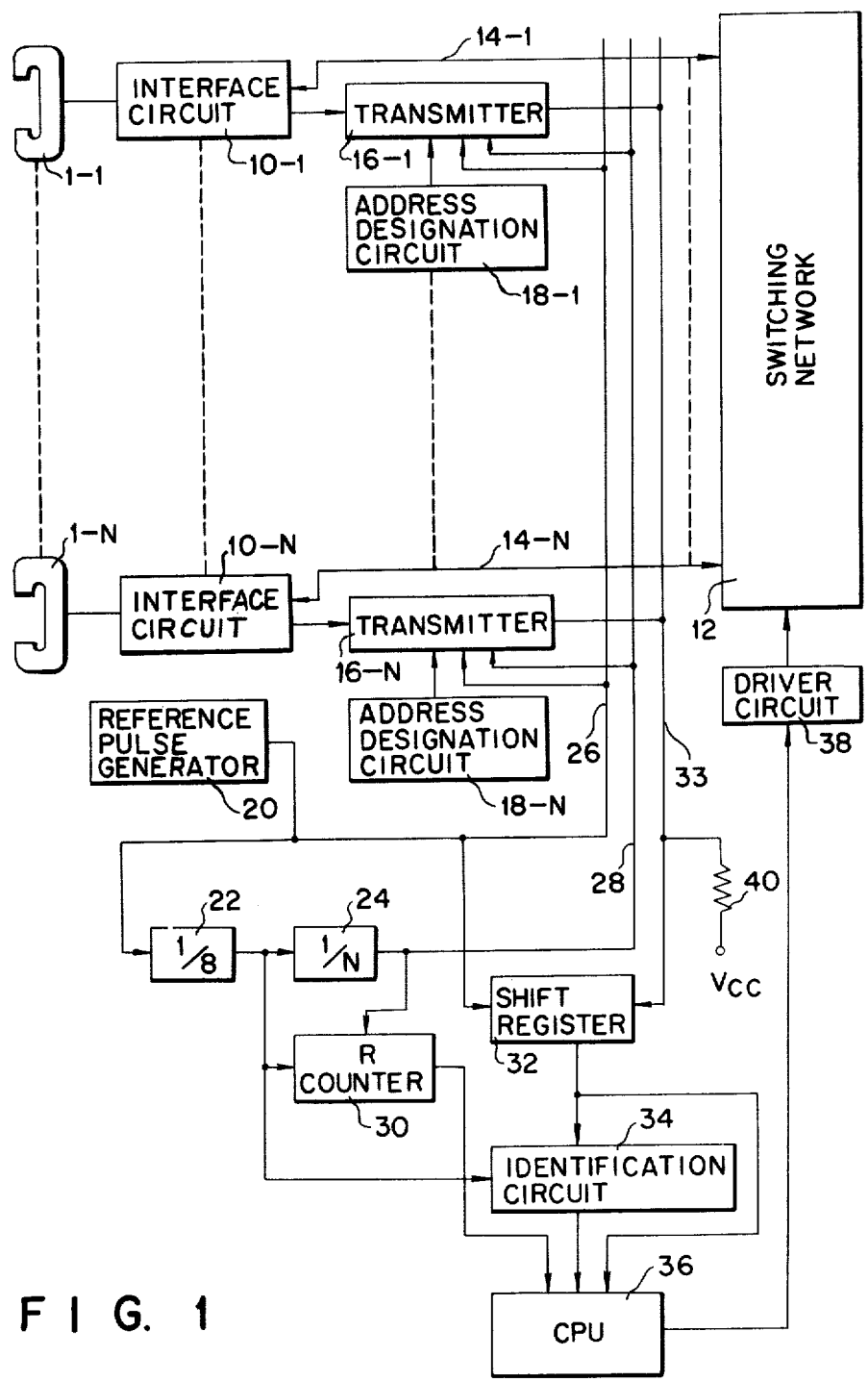

United States Patent [19]

Fukuda et al.

[11] 4,297,532
[45] Oct. 27, 1981

[54] INTERFACING CIRCUIT STATUS DETECTION ARRANGEMENT IN A TELEPHONE EXCHANGE

[75] Inventors: Takeo Fukuda; Kazuhiko Hanawa; Kiyoshi Urui; Michiko Haseyama, all of Yokohama, Japan

[73] Assignee: Tokyo Shibaura Denki Kabushiki Kaisha, Kawasaki, Japan

[21] Appl. No.: 50,228

[22] Filed: Jun. 20, 1979

[30] Foreign Application Priority Data

Jul. 11, 1978 [JP] Japan .................................. 53-84203

[51] Int. Cl.³ ............................................. H04M 3/22
[52] U.S. Cl. ........................... 179/18 AB; 179/18 ES; 179/18 FG
[58] Field of Search .......... 179/18 FG, 18 FF, 18 ES, 179/18 AD, 18 AB, 7 R, 7.1 R; 370/85

[56] References Cited

U.S. PATENT DOCUMENTS

| | | | |
|---|---|---|---|
| 3,787,635 | 1/1974 | Kammerl et al. | 179/18 ES |
| 3,980,833 | 9/1976 | Calcagno et al. | 179/18 FG X |
| 4,095,054 | 6/1978 | Anizan et al. | 179/18 ES |
| 4,117,278 | 9/1978 | Ehrlich et al. | 179/18 FG X |
| 4,154,988 | 5/1979 | Fechalos et al. | 179/18 ES X |

FOREIGN PATENT DOCUMENTS 53-47706 4/1978 Japan .
53-25727 7/1978 Japan .

OTHER PUBLICATIONS

"Number 1 ESS Scanner, Signal Distributor and Central Pulse Distributor", by L. Freimanis et al., vol. 43, 1964, *Bell System Technical Journal*, pp. 2255-2266.
"Horizon Communication System-An Advanced Technology System for Small Business Customers", by T. M. Quinn, *Private Electronic Switching Systems*, (International Conf., Apr. 1978), IEE Conference Publication No. 163, pp. 70-75.

*Primary Examiner*—Thomas W. Brown
*Attorney, Agent, or Firm*—Oblon, Fisher, Spivak, McClelland & Maier

[57] ABSTRACT

There is provided a telephone exchange including a switching network, a plurality of interface circuits whose corresponding transmit/receive paths are connected to the switching network, a data generator connected to the interface circuits to sequentially generate state information indicative of the states of the interface circuits, and a control circuit for controlling the switching network according to an output data from the data generator. The data generator generates state-variation information when the state of the interface circuit is varied and the control circuit is responsive to the state-variation information from the data generator to cause the switching network to be set to a state corresponding to the above-mentioned state information.

8 Claims, 2 Drawing Figures

F I G. 2
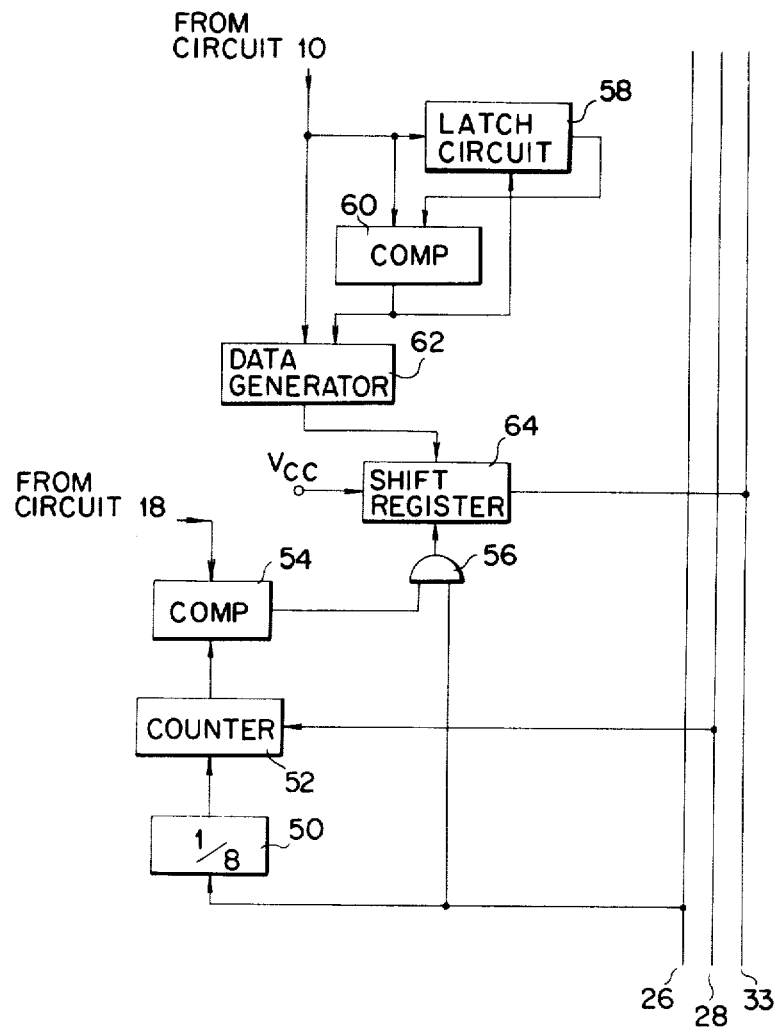

INTERFACING CIRCUIT STATUS DETECTION ARRANGEMENT IN A TELEPHONE EXCHANGE

This invention relates to a telephone exchange.

There have been developed various types of private branch exchanges. One type of private branch exchange includes a plurality of interface circuits connected directly to extensions, and/or through a telephone exchange at a central office to a telephone set on the external line, and a control circuit for scanning these interface circuits to sequentially produce state information corresponding to a hook-on state, hook-off state, dial operation state etc. of the respective interface circuits and for controlling a switching network according to the state information from the interface circuit to establish, for example, a speech path between the desired two interface circuits. If in the private branch exchange of this type a central control circuit, for example, detects that the state of the scanned interface circuit is different from the previous state thereof it controls the switching network according to the present state of the interface circuit. Then, the interface circuit of the next stage is scanned. If the central control circuit detects that the state of the currently scanned interface circuit is the same as the previous state thereof, the interface circuit of the next stage is scanned without changing the state of the switching network. In the conventional private branch exchange the control circuit per se scans a plurality of interface circuits, detects the state of the interface circuit and compares the present state of the interface circuit with the previous state thereof. For this reason, the original function of the central control circuit, such as the state switching function etc. for the switching network, is greatly restricted. Since the original function of the control circuit is more restricted as the number of the interface circuits to be controlled is increased, it has been difficult to increase the number of interface circuits.

It is accordingly the object of this invention to provide a telephone exchange in which a control circuit can be used efficiently.

According to this invention there is provided a telephone exchange comprising a switching network, a plurality of interface circuits whose transmit/receive paths are connected to the switching network, data generating circuit connected to the interface circuits to detect the state of each interface circuit, the data generating circuits generating state-variation information when a change of the state of a certain interface circuit is detected, and a control circuit for receiving the state variation information as an interrupt signal from the data generating circuits and setting the switching network to a state corresponding to the state of that interface circuit whose state variation has been detected.

This invention can be more fully understood from the following detailed description when taken in conjunction with the accompanying drawings, in which:

FIG. 1 is a block diagram showing a telephone exchange according to one embodiment of this invention; and FIG. 2 shows a detailed circuit diagram of a transmitter used in the telephone exchange of FIG. 1.

A telephone exchange according to one embodiment of this invention will be explained below by referring to the accompanying drawings.

A telephone exchange as shown in FIG. 1 includes N number of interface circuits 10-1 to 10-N connected to telephones 1-1 to 1-N, respectively. The interface circuits 10-1 to 10-N, though connected directly to the telephones 1-1 to 1-N, may be connected through a central office (not shown) to the telephones 1-1 to 1-N. The interface circuits 10-1 to 10-N are connected to a switching network through transmit/receive lines 14-1 to 14-N respectively. The interface circuits 10-1 to 10-N are connected to transmitter 16-1 to 16-N and parallel information of, for example, 8 bits which shows the hook-on state, hook-off state, dial operation state etc. of the telephones 1-1 to 1-N is sent to the transmitters 16-1 to 16-N. To the transmitters 16-1 to 16-N are connected address designation circuits 18-1 to 18-N including N different address information.

The telephone exchange includes a reference pulse generator 20 for generating a reference pulse signal of, for example, 1024 KHz, a ½ frequency divider 22 for frequency-dividing the output pulse signal of the reference pulse generator 20 and a 1/N frequency divider 24 for frequency-dividing the output pulse of the ½ frequency divider. The output pulses of the reference pulse generator 20 and 1/N frequency divider 24 are supplied respectively through a bit line 26 and frame line 28 to the transmitters 16-1 to 16-N. The output terminal of the 1/N frequency divider 24 is connected to a reset terminal R of a counter 30 which counts output pulses from the ½ frequency divider 22 and the output terminal of a reference pulse generator 20 is connected to a clock input terminal of a shift register 32 for storing output data which are sent through a data line 33 from the transmitters 16-1 to 16-N. The output terminal of the shift register 32 is connected to a data identification circuit 34 for receiving an output pulse as an enable signal from the ½ frequency divider. The output terminal of the shift register 32 is also connected to a central processing circuit (CPU) 36. CPU 36 supplies a control signal to a switching network driver circuit 38 according to the output data of the counter 30, shift register 32 and data identification circuit 34. The switching network 12 is set by the driver circuit 38 to a state corresponding to the control signal from CPU 36. A data line 33 is connected through a resistor 40 to a power supply Vcc of, for example, +5 V. In the normal state, the data line 33 is held at a high level potential.

Transmitters 16-1 to 16-N are constructed to have substantially the same arrangement. FIG. 2 shows an arrangement of the transmitter 16. The transmitter 16 includes a ½ frequency divider 50 for frequency-dividing a bit pulse which is sent through a bit line 26, and a counter 52 adapted to count an output pulse of the ½ frequency divider 50 and to be reset by a frame pulse which is sent through a frame line 28. A comparator 54 compares the contents of the counter 52 with the corresponding address data of the address designation circuit 18. When a coincidence occurs between both the input data to the comparator 54, an output signal is supplied from the comparator 54 to one input terminal of an AND gate 56 to enable the AND gate 56. A bit pulse sent through the bit line 26 is supplied to the other input terminal of the AND gate 56. The transmitter 16 further includes a latch circuit 58 for storing the state data from the interface circuit 10, and a comparator 60 for comparing the state data of the interface circuit 10 with the output data of the latch circuit 58 which can be a shift register. When the comparator 60 detects that both the data are different from each other, it produces a state variation detection signal or a low level signal. The state variation detection signal of the comparator 60 is supplied as a write enable signal to the latch circuit 58. The shift register 58 permits the state data from the interface circuit 10 to be stored therein. The state variation detection signal of the comparator 60 is supplied, together with the state data from the interface circuit 10, to a data generator 62. Responding to the state variation detection signal, the data generator 62 delivers a parallel information signal of, for example, 8 bits to the parallel input terminal of the shift register 64, the parallel information from the interface circuit 10 and state variation detection signal from the comparator 60. A power supply Vcc is connected to the series input terminal of the shift register 64. The shift register 64 is responsive to a bit pulse sent through the AND gate 56 to cause information bit stored therein to be supplied to the shift register 32 (FIG. 1) through the data line 33.

The operation of the telephone exchange as shown in FIGS. 1 and 2 will be explained below.

The transmitters 16-1 to 16-N are operated in the same fashion, except that they are allotted different time slots by the first to Nth addresses held in the address designation circuits 18-1 to 18-N and output data are produced at the different time slots.

The counter 30 counts pulses supplied from the reference pulse generator 20 through the ½ frequency divider and is reset by an output pulse from the 1/N frequency divider 24. On the other hand, the counter 52 of the transmitter 16 counts pulses supplied from the reference generator 20 through the ½ frequency divider 50 and is reset by an output pulse from the 1/N frequency divider 24. Thus, both counters have the same contents. When the content of the counter coincides with the corresponding address data of the address designation circuit 18, the comparator 54 produces a high level signal to cause AND gate 56 to be enabled. AND gate 56 is held in the enabled state until the content of the counter 52 is varied, i.e. until 8 bit pulses are applied through AND gate 56 to the shift register 64. The content of the shift register 64 is transferred to the shift register 32 in response to the 8 bit pulses applied through AND gate 56. When data transfer from the shift register 64 to the shift register 32 is completed, the data identification circuit 34 is responsive to an output pulse from the ½ frequency divider 22 to check whether or not a low level bit is present in the data stored in the shift register 32. When the data identification circuit 34 detects that the low level bit is present in the data stored in the shift register 32 it sends an interrupt signal to CPU 36. By so doing, CPU 36 controls the driver circuit 38 so that the switching network 12 is set to the state corresponding to the output data of the counter 20 and shift register 32.

Suppose that the telephone 1 is in the hook-on state and that the latch circuit 58 of the transmitter 16 stores "hook-on" state information. Since in this case the comparator 60 compares the state information from the interface circuit 10 with the state information from the latch circuit 58 and a coincidence is detected, no state variation detection signal is generated from the comparator 60. In consequence, the content of the latch circuit 58 is not changed and no parallel data is produced from the data generator 62. As a result, the shift register 64 responds to the 8 bit pulses supplied through AND gate 56 to transmit a high level data signal being applied to the serial input terminal to the shift register 32 through the data line 33. If the data identification circuit 34 detects that no low level bit is present in the data stored in the shift register 32, it delivers no interrupt signal to CPU 36. In consequence, CPU 36 continues executing a job now under execution without intervention by the data identification circuit 34.

When the handset of the telephone 1 is off the hook, the interface circuit 10 produces "hook-off" state information. When the comparator 60 detects that the state informtion of the interface circuit 10 and latch circuit 58 are different from each other, it produces a state variation detection signal. The latch circuit 58 is responsive to the state variation detection signal from the comparator 60 to store the "hook-off" state information from the interface circuit 10 and a data generator 62 produces 8-bit data including a low level bit corresponding to the state variation signal from the comparator 60 and data bits indicative of the "off-hook" state information from the interface circuit 10. The 8-bit data is supplied as a parallel mode from the data generator 62 to the shift register 64. The shift register 64 supplies the 8-bit data to the shift register 32. The 8 bit pulses to shift register 32 are supplied through the AND gate 56. When the data identification circuit 34 detects that the low level bit is included in the 8-bit data stored in the shift register 32, it delivers an interrupt signal to CPU 36. CPU 36 is responsive to the interrupt signal from the data identification circuit 34 to judge from which one of the interface circuits 10-1 to 10-N the state information currently stored in the shift register 32 is derived based on the contents of the counter 30. With respect to the interface circuit, CPU 36 determines the state to which the switching network 12 is held unless the state information from the interface circuit 10-1 to 10-N varies.

Though explained in connection with one embodiment of this invention this invention should not be restricted thereto. Although the address designation circuits 18-1 to 18-N, comparator 54, counter 52 and ½ frequency divider 50 are used to allot time data to the transmitters 16-1 to 16-N, use may be made of decoder circuits for decoding the output signal of the counter 30 and sequentially producing decoded output signals from N number of output terminals each connected to one input terminal of each of AND gates 56 of the transmitters 16-1 to 16-N. While the shift register 64 is so constructed that the 8-bit data are processed, it may be constructed such that the other number of bits, for example 16 bits, can be treated. In this case, it is necessary that the frequency ratio of the frequency dividers 22 and 50 be changed according to the number of bits of data to be processed. The frequency divider 50 and counter 52 of the transmitter 16 may be omitted and the output terminals of the counter 30 be connected to the comparators of all the transmitters 16-1 to 16-N.

What we claim is:

1. A telephone exchange comprising:
   a switching network;
   a plurality of interface circuits each having a transmit/receive path connected to the switching network;
   a plurality of data generating circuits respectively connected to the interface circuits for detecting the states of the interface circuits and for generating state variation information when the state of at least one of these interface circuits is varied from a previous state; and
   a control circuit for receiving as an interrupt signal the state variation information from the data generating circuits and for setting the switching network to a state corresponding to the state of that interface circuit whose state variation has been detected.

2. A telephone exchange according to claim 1 in which said plurality of data generating circuits comprise a plurality of transmitter circuits connected to corresponding interface circuits to supply, upon detection of a variation of the state of a corresponding interface circuit, state information representing the state of the corresponding interface circuit and state variation information representing such variation of the state of the corresponding interface circuit to said control circuit through a common data line; and address designating means for sequentially energizing said transmitter circuits.

3. A telephone exchange according to claim 2 in which each of said transmitter circuits comprises a first memory for storing state information representing the state of the interface circuit;
- a first comparator for comparing the state information representing the current state of the interface circuit with output information of said first memory representing the previous state of the interface circuit and for producing a state variation detection signal, when it detects that state information representing the current state of the interface circuit is different from the output information of said first memory, to cause said first memory to be enabled to permit the current state information from the interface circuit to be stored in said first memory;
- a state information generator responsive to the state variation detection signal from said first comparator to generate information corresponding to state information from the interface circuit and a state variation detection signal from said first comparator; and
- a second memory for temporarily storing output data from said data generator and for supplying the stored data to said common data line.

4. A telephone exchange according to claim 3 in which said address designating means comprises a plurality of address designating circuits for storing address data which are different from each other, and said transmitter circuits further collectively include;
- a reference signal generator;
- a frequency divider circuit for frequency-dividing an output signal from said reference signal generator;
- a counter circuit for counting output signals from a frequeny divider circuit;
- a plurality of second comparators each between said counter circuit and corresponding one said address designating circuits to produce an output signal when a coincidence occurs between the contents of the counter circuit and the address data of the address corresponding designating circuit; and
- a plurality of AND gate circuits adapted to be enabled by an output signal from a corresponding one said of said second comparitors to cause an output signal from said reference signal generator to be supplied as a read out signal to a corresponding one of said second memories to permit data stored in the corresponding second memory to be read therefrom.

5. A telephone exchange according to claim 4 in which said control circuit comprises a frequency divider for frequency-dividing an output signal from said reference signal generator; a counter for counting output signals from said frequency divider; a data identification circuit for producing an output signal when information corresponding to said state variation detection signal is included in the output information of the second memory; and a control section responsive to an output signal from the data identification circuit for setting the switching network to a state corresponding to the output data of the counter and output information from the second memory.

6. A telephone exchange according to claim 4 in which said second memory is comprised of a shift register.

7. A telephone exchange according to claim 3 in which said first and second memories are comprised of shift registers.

8. A telephone exchange according to claim 3, in which said address designating means comprises a plurality of address designating circuits respectively connected to said transmitter circuits to sequentially designate the addresses of said transmitter circuit, and said control circuit comprises a counter for counting the output signals of said reference signal generator, a data identification circuit responsive to the output data from the second memory to produce an output signal when information corresponding to said state variation detection signal is included in the output data from the second memory and a control section responsive to an output signal from said data identification circuit to set the switching network to a state corresponding to the contents of the counter and output data of said second memory.

* * * * *